(12) United States Patent
Yomogida (10) Patent No.: US 6,622,692 B2
(45) Date of Patent: Sep. 23, 2003

(54) COMMON RAIL FUEL INJECTION DEVICE

(75) Inventor: Koichiro Yomogida, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 111 days.

(21) Appl. No.: 09/990,927

(22) Filed: Nov. 14, 2001

(65) Prior Publication Data

US 2003/0089332 A1 May 15, 2003

(51) Int. Cl.$^7$ .......................... F02M 45/00; F02D 41/34
(52) U.S. Cl. ...................... 123/299; 123/501; 123/480; 123/490
(58) Field of Search .................. 123/299, 472, 123/478, 480, 490, 494, 501; 239/585.5

(56) References Cited

U.S. PATENT DOCUMENTS

| | | | | |
|---|---|---|---|---|
| 4,782,803 A | * | 11/1988 | Kikuchi | 123/300 |
| 5,070,836 A | * | 12/1991 | Wahl et al. | 123/299 |
| 5,443,047 A | * | 8/1995 | Ishiwata et al. | 123/446 |
| 6,085,730 A | * | 7/2000 | Coatesworth et al. | 123/480 |
| 6,142,121 A | * | 11/2000 | Nishimura et al. | 123/456 |

FOREIGN PATENT DOCUMENTS

| | | | | |
|---|---|---|---|---|
| JP | 317230 | * | 11/1994 | F02M/51/06 |
| JP | 07-197840 | | 8/1995 | F02D/41/34 |

* cited by examiner

*Primary Examiner*—Hieu T. Vo
*Assistant Examiner*—Hai H Huynh
(74) *Attorney, Agent, or Firm*—McCormick, Paulding & Huber LLP (57) ABSTRACT

A common rail fuel injection device for ensuring the main injection start timing by correcting a pulse start time of a main injection command pulse, in accordance with the length of an interval between the main injection and a pilot injection. The recovery degree of current energy for driving an injector varies in accordance with the length of the interval Tint from a pilot injection end (T4) to an main injection start time (T6), and this variation affects the main injection start time. By taking a longer value for an injector drive delay time (Td) as the length of the interval Tint is shorter, a pulse start time (T5) of a main injection command pulse CPm for performing the main injection is corrected as a more advanced timing, and hence the fuel injection for the main injection can be performed at a prescribed injection start timing.

4 Claims, 6 Drawing Sheets

FIG. 6

COMMON RAIL FUEL INJECTION DEVICE

CROSS REFERENCE TO RELATED APPLICATION

This application corresponds to Japanese Patent Application No. 2000-069993 filed in JPO on Mar. 14, 2000, the entire disclosure of which is incorporated herein by reference.

BACKGROUND OF THE INVENTION

1. Field of the Invention

The present invention relates to a common rail fuel injection device for injecting, via injectors, pressurized fuel accumulated in a common rail, and more particularly to a common rail fuel injection device for performing fuel injection by means of a main injection and a pilot injection by which a small quantity of fuel is injected prior to the main injection.

2. Description of the Related Art

In the prior art, a common rail fuel injection system is known as a method for obtaining a high fuel injection pressure in a fuel injection system for an engine, and as a method for optimally controlling fuel injection conditions such as the injection time point and injection quantity, in accordance with the operating state of the engine. A common rail fuel injection system is a system in which an pressurized operating fluid raised to a prescribed pressure by means of a fuel supply pump is accumulated inside a common rail, the accumulated operating fluid is supplied to injectors, and fuel is injected into from the injectors disposed respectively on a plurality of associated cylinders, under optimal fuel injection conditions such as fuel injection quantity and fuel injection time which are determined by a controller in accordance with the operating state of the engine. Each injector is provided with a control valve for controlling passing or cutoff of fuel which is supplied via a fuel supply pipe.

If the fuel itself forms the operating fluid, then the common rail accumulates pressurized fuel therein, and a fuel pressure corresponding to the injection pressure is exerted constantly in a fuel supply path formed from the common rail, via fuel supply pipes, to nozzles formed at the front end of each injector. In order that each injector can only inject fuel at prescribed time, each injector includes, as a control valve, an open/close valve for opening and shutting the fuel supply path. The open/close valve is driven by an actuator which is constituted by an electromagnetic solenoid, piezoelectric element, magnetic distortion element, or the like. The controller controls the pressure in the common rail and the operation of the control valves of the injectors, in such a manner that the pressurized fuel is injected by each injector at optimal injection conditions with respect to the operating state of the engine.

In a common rail fuel injection device, the open/close valves are, for example, electromagnetic valves, such as electromagnetic solenoids, operated by electromagnetically activated actuators, on the basis of electrical signals output by the controller. With regard to the fuel injection quantity, the controller determines a target fuel injection quantity in accordance with the operating state of the engine, and controls the time at which the injector actuators are operated on the basis of the target fuel injection quantity thus determined. If the actuators are electromagnetic valves, then this involves controlling the length of the time for which the electromagnetic valve opens, in other words, the pulse time length of the injection command pulse output by the controller to the electromagnetic valve. However, since the amount of fuel injected per unit time, in other words, the fuel injection rate, depends not only on the pulse duration but also the fuel pressure in the common rail, the pulse time is determined with respect to both the target fuel injection quantity and the common rail fuel pressure.

Figure 1:
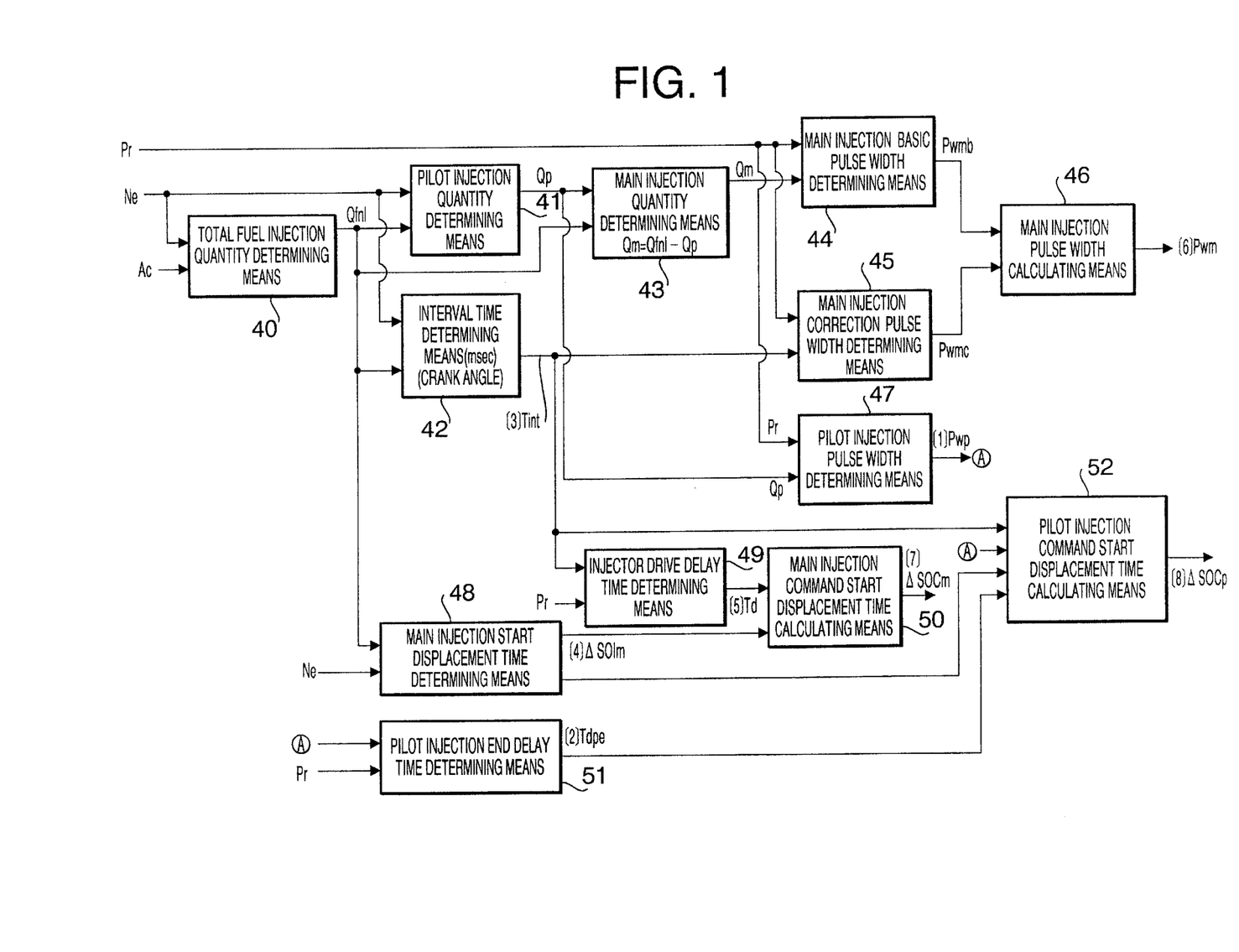
FIG. 1 is a block diagram showing one example of a controller in one embodiment of a common rail fuel injection device according to the present invention.
Figure 5:
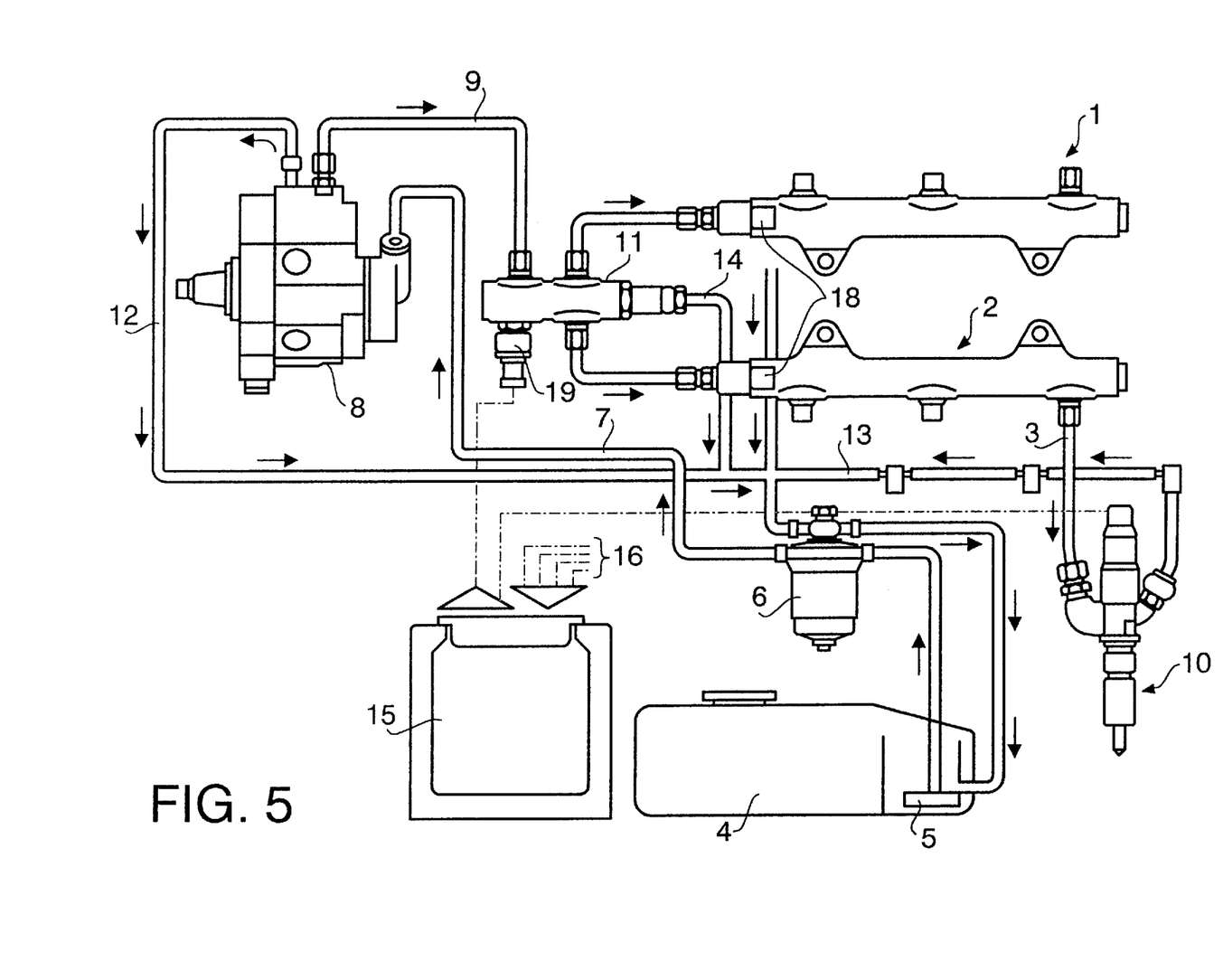
FIG. 5 is an approximate diagram showing one example of a common rail fuel injection system to which the embodiment of the common rail fuel injection device according to the present invention is applied.

FIG. 5 shows an overview of a common rail fuel injection system in which a common rail fuel injection device is applied. The common rail fuel injection system 1 illustrated as shown in FIG. 1 is a system for a six-cylinder engine, in which fuel in a fuel tank 4 is passed through a pre-filter 5 and a filter 6 including a circulating valve and demoisturizer, then travels along a fuel pipe 7, and is supplied to a fuel supply pump 8 which is, for example, a variable capacity high-pressure plunger-type pump. The fuel supply pump 8 is driven by the engine output, and raises the fuel pressure to a prescribed pressure required, and supplies the fuel to a common rail 2, via a fuel pipe 9 and a pressure control valve 11. On the outlet side of the fuel supply pipe 8 and the inlet side of the common rail 2, the pressure control valve 11 is provided in order to maintain the fuel pressure in the common rail 2 at a prescribed pressure. Fuel relieved from the fuel supply pump 8 is returned via a return pipe 12 to the fuel tank 4. The fuel inside the common rail 2 is supplied to a plurality of injectors 10 (only one injector is depicted here) via a fuel supply pipe 3. Of the fuel that is supplied to the injectors 10 via the fuel supply pipe, fuel which is not consumed in injection into a combustion chamber, and the fuel which is relieved by the pressure control valve 11 is returned to the fuel tank 4 by means of return pipes 13 and 14.

The controller 15 is an electronic control unit which inputs signals from various sensors 16 for detecting the operating state of the engine, for instance, an engine cylinder discriminating sensor, a crank angle sensor for detecting the number of the engine revolution Ne and the top dead center (TDC), an accelerator opening sensor for detecting the depression amount of the accelerator pedal Ac, a water temperature sensor for detecting the temperature of the cooling water, an intake tube pressure sensor for detecting the internal pressure of the intake tube, and the like. The pressure of the common rail 2 is detected by a pressure sensor 18 provided at the pressure control valve 11, and a detection signal for the fuel pressure Pr inside the common rail 2 (hereinafter, the common rail pressure is called Pr) detected by the pressure sensor 18 is also input to the controller 15. On the basis of these signals, the controller 15 controls the injection conditions for the fuel from the injectors 10, in other words, the fuel injection time (injection start time point and duration), injection quantity and the like such that the engine output is optimally suited to the engine operating state. As the injectors 10 inject fuel, the fuel in the common rail 2 is consumed and the fuel pressure inside the common rail falls. However, the controller 15 controls this common rail pressure Pr by controlling the pressure of the high-pressure fuel from the fuel supply pump 8 by means of a control unit 19 of the pressure control valve 11, in such a manner that the common rail pressure Pr remains constant, or in such a manner that the fuel injection pressure required according to the operating state of the engine is achieved.

Figure 6:
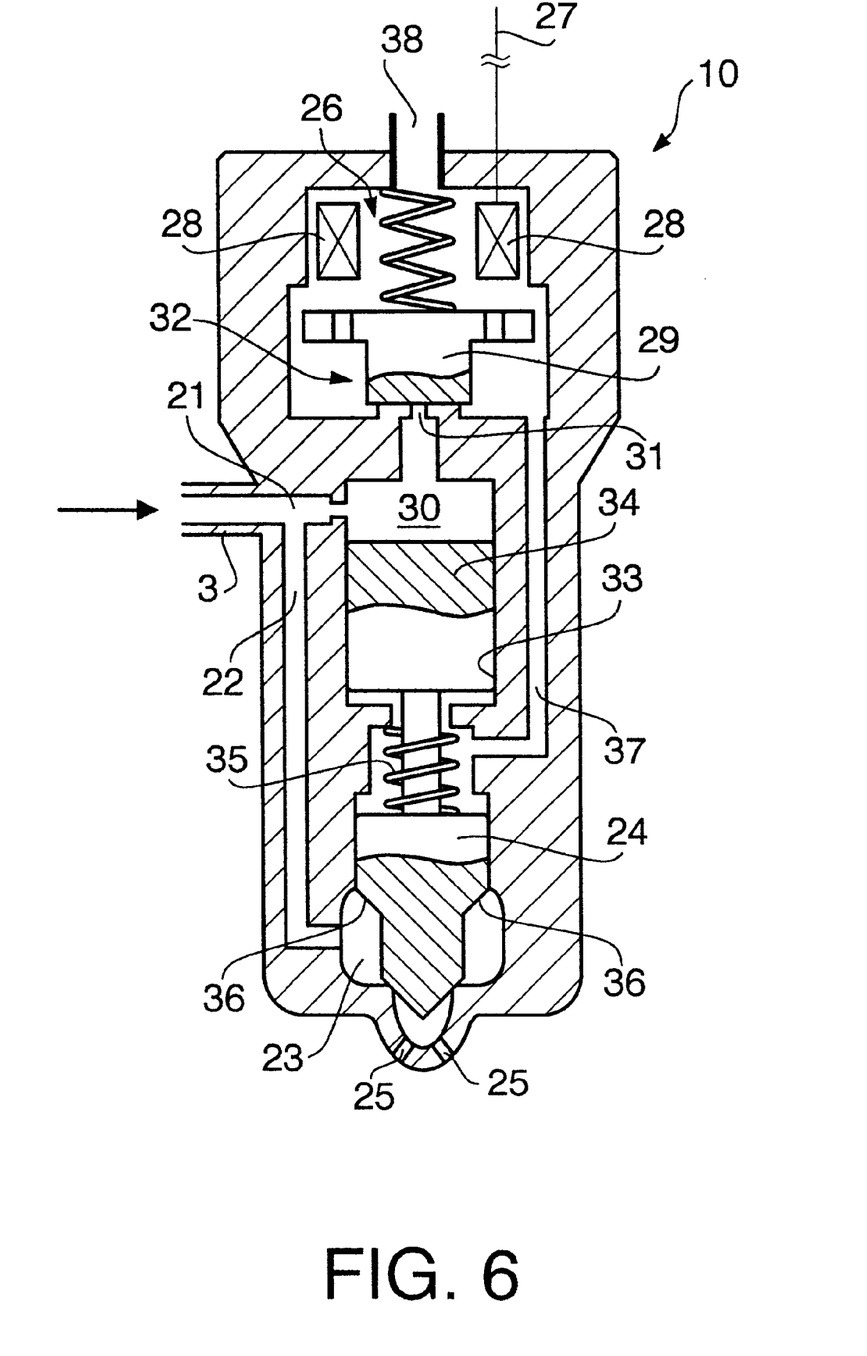
FIG. 6 is a sectional diagram showing one example of an injector used in the common rail fuel injection system illustrated in FIG. 5.

FIG. 6 is an approximate longitudinal sectional view showing one example of an injector used in a common rail fuel injection system. The injector 10 is installed in a sealed state by means of a sealing member in a cavity portion provided in the base of the cylinder head, or the like (not illustrated). The fuel supply pipe 3 is connected to the upper side portion of the injector 10, and a fuel supply path is formed by this fuel supply pipe 3, and fuel passages 21, 22 formed inside main body of the injector 10. Fuel supplied via this fuel path travels via a fuel reservoir 23 and paths around a needle valve 24, and is injected into a combustion chamber from a nozzle 25 formed at the front end portion of the injector 10. The nozzle 25 opens when the needle valve 24 lifts open.

In order to control the lifting of the needle valve 24, the injector 10 is provided with a needle lifting mechanism based on a balance chamber method. An electromagnetic actuator 26 for driving an electromagnetic valve is provided on the uppermost portion of the injector 10, and a control current corresponding to a command pulse from the controller 15 is supplied via a signal line 27 to a solenoid 28 of the electromagnetic actuator 26. When the solenoid 28 is magnetized, an armature 29 rises up and opens a control valve 32 provided at the end of a fuel path 31, thereby releasing, via the fuel path 31, the pressure of the fuel supplied to the fuel supply chamber 30 from the fuel supply path. A cavity 33 is formed inside the injector 10. A control piston 34 is provided inside the cavity 33 such that the control piston 33 can moves upwards and downwards. Since the lifting force pushing the control piston 34 upwards due to the fuel pressure acting on the tapered face 36 facing a fuel reservoir 23 is greater than the force pressing the control piston 34 downwards due to the lowered pressure inside the pressure control chamber 30 and the spring force of a return spring 35, the control piston 34 is raised up. Consequently, the needle valve 24 lifts and fuel is injected from the nozzles 25. The fuel injection time point is determined by the lift time point of the needle valve 24, while the fuel injection quantity is determined by the fuel pressure in the fuel path and the lifting of the needle valve 24 (amount of lift and duration of lift). In other words, the needle valve 24 is raised and lowered by the action of the fuel pressure inside the pressure control chamber 30, and the control valve 32 releases the fuel pressure inside the pressure control chamber 30 by discharging fuel from inside the pressure control chamber 30.

In general, the relationship between the fuel injection quantity of the injector 10 and the pulse width of the command pulse output by the controller 15 is determined by a map which uses the common rail pressure Pr (fuel pressure inside the common rail 2) as a parameter. Assuming the common rail pressure Pr is constant, the greater the pulse width, the greater the quantity of fuel injected, whereas if the pulse width remains constant, the fuel injection quantity will rise with increase in the common rail pressure Pr. On the other hand, since the fuel injection starts and stops with a constant time delay compared to the fall time and rise time of the command pulse, it is possible to control the injection time point by controlling the on-timing and the off-timing of the command pulse. A uniform relationship between a basic injection quantity and engine revolutions is previously prepared as a basic injection quantity characteristics map, taking the depression amount of an accelerator pedal as a parameter. The injected fuel quantity is then determined on the basis of this basic injection quantity characteristics map, in accordance with the current operating state of the engine.

In accordance with the fuel injection at each cylinder during the engine cycle, the common rail pressure Pr repeats a cycle in which the pressure Pr starts to fall with a time delay after the start of injection, and after injection has been completed, the pressure Pr recovers due to output of fuel from the high-pressure fuel supply pump 8 in order to perform fuel injection at the next cylinder where the next combustion is supposed to occur in accordance with the combustion sequence. Since the engine is a multiple-cylinder engine, as shown in FIG. 5, the controller 15 controls the fuel injection from the injector 10 separately for each cylinder.

A method for determining the pulse time of command pulses for injection output by the controller to injector actuators in order to perform fuel injection is disclosed, for example, in Japanese Patent Application Laid-open No. 56-143318, or No. 7-197840. Japanese Patent Application Laid-open No. 56-143318 discloses an injection control amount setting device which determines control amounts for controlling fuel supply quantity and controlling a start-up process in an engine such as a diesel engine. As for the control amounts, the fuel supply start time point and/or supply duration, and the start valve switchover time point are taken as the control amounts. Each time point is determined in accordance with the fuel supply quantity. In particular, the injection duration is calculated as a value which is proportional to the injection quantity and inversely proportional to the square root of the injection pressure.

Japanese Patent Application Laid-open No. 7-197840 discloses a method and device for correcting fuel injection pulse width for accurately controlling the fuel injection quantity by correcting the fuel injection pulse width which determines the injector release duration, with respect to the injection pressure and/or fuel injection temperature.

With the aim of lowering combustion noise and preventing deterioration of exhaust gas characteristics in a diesel engine, so-called pilot injection control is performed in which a small quantity of fuel is injected prior to the main injection. By performing this pilot injection, the temperature of the combustion chamber is raised in advance, thereby preventing sudden combustion of the injected fuel. Consequently, the generation of so-called diesel 'knock' can be prevented, and the ratio of nitrogen oxide contained in the exhaust gas can also be reduced. The pilot injection quantity is determined by taking account of the amount of generated nitrogen oxide which is determined by experimentation. Pilot injection is usually necessary when the engine is in a low-load idling operating state, and therefore the pilot injection quantity is determined either as an injection quantity of a small ratio compared to the overall injection quantity, or as an uniform small absolute quantity.

When performing pilot injection in fuel injection control device, the main injection time point for performing the main fuel injection, the interval from the end of the pilot injection until the main injection time point, and the pilot injection quantity, are determined in accordance with the operating state of the engine. The output time point of the pilot injection pulse output from the controller in order to perform pilot injection is calculated back from aforementioned main injection time point, according to the sum of the above interval and the pilot injection duration which is determined from the pilot injection quantity. Furthermore, the response delay from the time point at which an output signal is emitted by the controller until the control valve of the injector starts to operate is also taken into account in determining the above output time point of the pilot injection pulse.

When performing pilot injection in a common rail fuel injection device, if the injector control valve is, for example, an electromagnetic valve operated by an electromagnetic actuator and the interval between the pilot injection and the main injection is short, the electromagnetic valve must be driven again immediately after expending current energy for the pilot injection before sufficient current energy has accumulated for the main injection. In order to open the injector instantaneously, a large current is passed at the start of the actuation process. However, if the accumulated current energy is insufficient, then the initial current value will be inadequate, it will not be possible to open the injector instantaneously, and hence the needle will lift slowly, thereby causing operating delay.

Therefore, in a common rail fuel injection device, pressurized fuel from a high-pressure fuel supply pump is accumulated in a common rail, fuel supplied from the common rail is injected from injectors into combustion chambers by the operation of control valves, and a controller outputs, to the control valves, drive signals based on command pulses respectively corresponding to a main injection and a pilot injection in order to divide the fuel injection from the injectors into a main injection for injecting a main injection quantity and a pilot injection for injecting a pilot injection quantity which precedes the main injection by the interval, on the basis of a fuel injection quantity determined according to a detection signal from detection means for detecting the operating state of the engine. The length of the interval affects the lift response of the control valves in the main injection, in other words, the delay in the injection time point. Therefore, there is a problem in making the fuel injection for main injection start at the desired fuel injection start time point if the length of the interval varies.

SUMMARY OF THE INVENTION

It is an object of the present invention to provide a common rail fuel injection device for performing fuel injection by means of a main injection and a pilot injection which is implemented prior to the main injection, as described above, and enabling the fuel injection for main injection to be performed at suitably accurate timing, even in cases where there is variation in the length of the interval which affects the current recovery required for outputting a drive signal to the control valves.

According to one aspect of the present invention, there is provided a common rail fuel injection device including a common rail which accumulates pressurized fuel from a high-pressure fuel supply pump, injectors for injecting fuel supplied from the common rail into combustion chambers by the operation of control valves, and detecting means for detecting the operating state of the engine. The injector divides fuel injection into a main injection and a pilot injection that precedes the main injection in accordance with an operating state of the engine detected by the detecting means. This common rail fuel injection device further includes a controller which calculates command pulses corresponding to the main injection and the pilot injection and outputs, to the control valves, a drive signal corresponding to each command pulse, in order to divide the fuel injection from the injectors into a main injection for injecting a main injection quantity and a pilot injection for injecting a pilot injection quantity prior to the main injection, in response to the operating state of the engine which is detected by the detecting means. With this common rail fuel injection device, the controller determines an interval between target injection start time of the main injection and the injection end of the pilot injection, on the basis of the operating state of the engine, and corrects the pulse start time of the command pulse corresponding to the main injection in accordance with the interval, in order to set the actual injection start time of the main injection to the target injection start time.

By adopting this composition in a common rail fuel injection device, the controller corrects the pulse start time of the command pulse for main injection in accordance with the interval, when outputting command pulses for pilot injection and main injection, in such a manner that the fuel injection for main injection starts at the end of a time interval after the pilot injection. Therefore, the actual main injection starts at the target injection start timing, without the occurrence of delays in the injection start timing of the main injection caused by variation in the recovery amount of the current energy required to output the drive signals to drive the injectors. The recovery amount of the current energy is caused by variation in the length of the interval.

The controller calculates the pulse start time of the command pulse corresponding to the main injection by going back an injector drive delay time determined on the basis of the interval, with respect to the target injection start time of the main injection. The shorter the length of the interval is, the greater the influence on the main injection caused by the drive current for driving the actuators is, causing the main injection time to tend to delay at which injection actually takes place. Since the length of the interval is reflected in the injector drive delay time, then by setting the pulse start time of the command pulse corresponding to the main injection to a timing going back the injector drive delay time with respect to the target injection start time of the main injection, it is possible to start main injection at the desired injection start timing, without the interval affecting the main injection timing, and hence adverse effects on combustion characteristics can be suppressed.

The controller also performs correction for advancing the pulse start time of the command pulse corresponding to the main injection, by setting the injector drive delay time to a longer value, as the value of the interval is shorter. The pulse width of the command pulse for main injection is corrected to a larger value, as the interval is shorter. Therefore, if the length of an interval changes, the pulse start time of the command pulse for main injection is corrected in accordance with this interval change, and hence adverse effects on the main injection timing can be suppressed.

The injector includes a pressure control chamber into which a part of the fuel supplied from the common rail is supplied, a needle valve which is moved upwards and downwards by the action of the pressure of fuel inside the pressure control chamber, and thereby opens and closes nozzles formed in the front end section of the injector for injecting fuel. The injector further includes the control valve which releases the fuel pressure of the pressure control chamber by discharging fuel from the pressure control chamber, and an actuator which is driven by the drive signal and thereby operates the control valve. The actuator for driving the control valve is an electromagnetically driven actuator, such as an electromagnetic solenoid or piezoelectric element.

Preferably, the determination of the injector drive delay time depends on the fuel pressure in the common rail as well.

Preferably, the common rail fuel injection device according to the present invention includes an engine revolution sensor which detects engine revolutions, accelerator operation amount sensor which detects the operating amount of the accelerator, and a pressure sensor which detects the fuel pressure of the common rail. In this case, the controller calculates a total fuel injection amount on the basis of the engine revolutions detected by the engine revolution sensor and the operation amount of the accelerator, determines the pilot fuel injection amount, the interval and the main fuel injection time point on the basis of the total fuel injection amount and the engine revolutions. Moreover, the controller determines the injector operation delay time from the start time of the main fuel injection command pulse to the start time of the main fuel injection, based on the interval and the pressure of the common rail, and then correct the start time of the command pulse corresponding to the main fuel injection by going back the injector operation delay time with respect to the target main fuel injection start time point.

Preferably, the controller determines the pulse width of the pilot injection command pulse on the basis of the pilot injection quantity and the common rail fuel pressure.

Preferably, the controller calculates the main injection quantity by subtracting the pilot injection quantity from the total fuel injection quantity, determines a basic pulse width for the main injection command pulse on the basis of the common rail fuel pressure and the main injection quantity, determines a correction pulse width for the main injection command pulse on the basis of the common rail fuel pressure and the interval, and derives the pulse width of the main injection command pulse by summing the basic pulse width and the correction pulse width.

Preferably, the main injection start time and the pulse start time of the pilot injection command pulse are values based on the top dead center.

Preferably, the common rail fuel injection device according to the present invention is applied to a diesel engine.

According to another aspect of the present invention, there is provide a fuel injection control method in a common rail fuel injection device including a common rail which accumulates pressurized fuel from a fuel supply pump, detecting means for detecting the operating state of the engine, injectors for injecting fuel supplied from the common rail into combustion chambers and dividing fuel injection into the main injection and the pilot injection that precedes the main injection in accordance with the operating state of the engine detected by the detecting means, and a controller which calculates command pulses corresponding to the main injection and the pilot injection, and outputs, to the control valves, a drive signal corresponding each command pulse, in order to divide the fuel injection from the injectors into a main injection for injecting a main injection quantity and a pilot injection for injecting a pilot injection quantity prior to the main injection, in response to the operating state of the engine which is detected by the detecting means. In this method, an interval between a target injection start time of the main injection and the injection end of the pilot injection is determined by the controller, on the basis of the operating state of the engine. Moreover, the pulse start time of the command pulse corresponding to the main injection is corrected by the controller, in accordance with the interval, in order to set the actual injection start time of the main injection to the target injection start time.

Preferably, the pulse start time of the command pulse corresponding to the main injection is calculated by the controller by going back an injector drive delay time determined on the basis of the interval, with respect to the target injection start time of the main injection.

Preferably, correction for advancing the pulse start time of the command pulse corresponding to the main injection is performed by the controller, by setting the injector drive delay time to a greater value as the value of the interval is smaller.

Preferably, the injectors include a pressure control chamber into which a part of the fuel supplied from the common rail is supplied, a needle valve which is moved upwards and downwards due to the action of the pressure of fuel inside the pressure control chamber, and opens and closes nozzles formed in the front end section of the injector for injecting fuel, the control valve for releasing the fuel pressure inside the pressure control chamber by discharging fuel from the inside of the pressure control chamber, and an actuator which is driven by the drive signal, and thereby operates the control valve.

Preferably, the injector drive delay time is determined on the basis of the fuel pressure in the common rail as well.

Preferably, the common rail fuel injection device includes an engine revolution sensor which detects engine revolutions, accelerator operation amount sensor which detects the operating amount of the accelerator, and a pressure sensor which detects the fuel pressure of the common rail. In this device, a total fuel injection amount is calculated by the controller on the basis of the engine revolutions detected by the engine revolution sensor and the operation amount of the accelerator. The pilot fuel injection amount, the interval and the main fuel injection time point is determined by the controller, on the basis of the total fuel injection amount and the engine revolutions. In addition, the injector operation delay time from the start time of the main fuel injection command pulse to the start time of the main fuel injection is determined by the controller, based on the interval and the pressure of the common rail, and then the start time of the command pulse corresponding to the main fuel injection is corrected by the controller by going back the injector operation delay time with respect to the target main fuel injection start time point.

Preferably, the pulse width of the command pulse corresponding to the pilot injection is calculated by the controller, on the basis of the pilot fuel injection amount and the fuel pressure of the common rail.

Preferably, by the controller, the main injection quantity is calculated by subtracting the pilot injection quantity from the total fuel injection quantity, and a basic pulse width for the main injection command pulse is determined on the basis of the common rail fuel pressure and the main injection quantity. Furthermore, by the controller, a correction pulse width for the command pulse corresponding to the main injection is determined, on the basis of the common rail fuel pressure and the interval, and thereby the pulse width of the command pulse corresponding to the main injection is calculated, by summing the basic pulse width and the correction pulse width.

Preferably, the target main injection start time and the pulse start time corresponding to the main fuel injection are values based on the top dead centre.

Preferably, the fuel injection control method for a common rail fuel injection device according to the present invention is applied to a diesel engine.

DETAILED DESCRIPTION OF THE INVENTION

Below, an embodiment of a common rail fuel injection device according to the present invention is described with reference to the accompanying drawings.

A controller 15 shown in FIG. 1 includes total fuel injection quantity determining means 40 for determining the total quantity Qfnl of fuel to be injected, on the basis of the engine revolutions Ne and the amount of accelerator operation Ac, pilot injection quantity determining means 41 and interval time determining means 42 for respectively determining a pilot injection quantity Qp and interval Tint, on the basis of the total fuel injection quantity Qfnl and the engine revolutions Ne, main injection quantity determining means 43 for determining a main injection quantity Qm by subtracting the pilot injection quantity Qp from the total fuel injection quantity Qfnl, main injection basic pulse width determining means 44 for determining a basic pulse width Pwmb for the main injection command pulse, on the basis of the main injection quantity Qm and the common rail pressure Pr, main injection correction pulse width determining means 45 for determining a correction pulse width Pwmc for the main injection command pulse, on the basis of the interval Tint and the common rail pressure Pr, and main injection pulse width calculating means 46 for calculating the pulse width Pwm for the main injection command pulse by adding the basic pulse width Pwmb and correction pulse width Pwmc for the main injection command pulse CPm. The interval Tint is called the interval time Tint in the drawings.

The controller 15 also includes pilot injection pulse width determining means 47 for determining the pulse width Pwp of the pilot injection command pulse CPp, on the basis of the pilot injection quantity Qp and the common rail pressure Pr, main injection start displacement time determining means 48 for determining a main injection start displacement time ΔSOIm, on the basis of the total fuel injection quantity Qfnl and the engine revolutions Ne, an injector drive delay time determining means 49 for determining the injector drive delay time Td, on the basis of the interval Tint and the common rail pressure Pr, and main injection command start displacement time determining means 50 for determining the main injection command start displacement time ΔSOCm, on the basis of the main injection start displacement time ΔSOIm and the injector drive delay time Td. The controller 15 further includes a pilot injection end delay time determining means 51 for determining the pilot injection end delay time Tdpe on the basis of the pulse width Pwp of the pilot injection command pulse CPp and the common rail pressure Pr, and pilot injection command start displacement time calculating means 52 for calculating a pilot injection command start displacement time ΔSOCp by adding together the main injection start displacement time ΔSOIm, the interval Tint, the pilot injection end delay time Tdpe, and the pulse width Pwp of the pilot injection command pulse CPp. The pulse start time of the pilot injection command pulse CPp is determined by the pilot injection command start displacement time ΔSOCp (before or after) from the top dead center.

Figure 2:
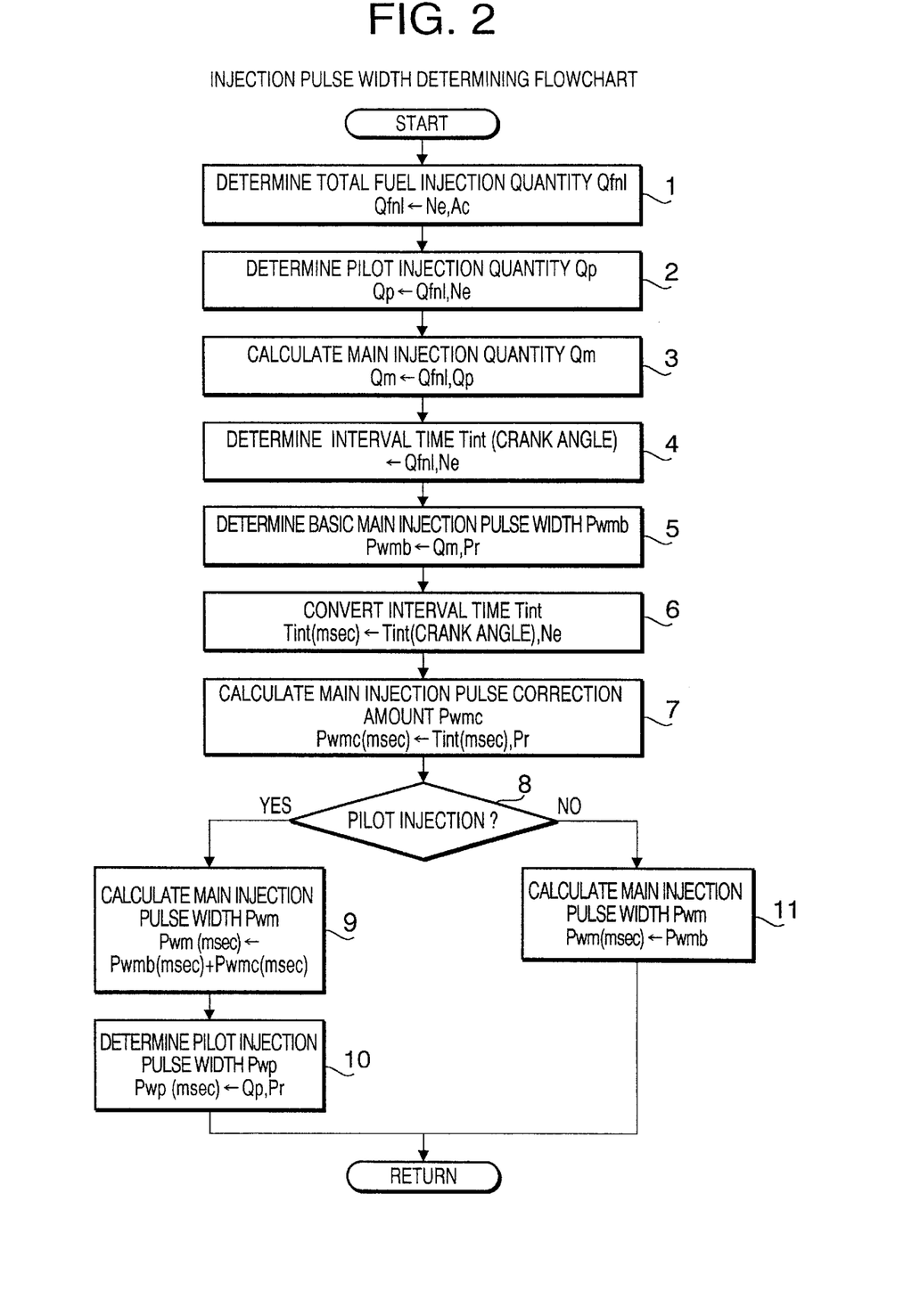
FIG. 2 is a flowchart showing one example of a control sequence for determining the pulse width of each command pulse by the controller shown in FIG. 1.

The fuel injection control operation in this common rail fuel injection device is now described with reference to the flowcharts in FIG. 2 and FIG. 3, and the timing chart for injector drive control illustrated in FIG. 4. FIG. 4 shows graphs depicting temporal change of (a) the waveform of the command pulse CP, (b) the waveform of the drive current Ic supplied to the injector, and (c) amount of lift of the needle in the injector, with a horizontal axis being time axis, when fuel injection is performed by means of the common rail fuel injection device according to the present invention. As shown in FIG. 4, the controller 15 outputs a pilot injection drive current Icp and main injection drive current Icm to the injector 10, in accordance with the command pulse for pilot injection CPp and the command pulse for main injection CPm. After starting to apply the respective drive currents, Icp, Icm, the needle of the injector 10 generates lift Lp for pilot injection and lift Lm for main injection, after respective time delays.

As means for detecting the operating state of the engine, for example, there are provided an engine revolution sensor for detecting the engine revolutions Ne, and an accelerator operation amount sensor for detecting the amount Ac of accelerator operation (amount of depression of the accelerator pedal) which indicates the engine load. As shown in FIG. 2, the total fuel injection quantity Qfnl is determined on the basis of the engine revolutions Ne detected by the engine revolutions sensor, and the accelerator operation amount Ac detected by the accelerator operation amount sensor, by consulting previously determined map data (not illustrated) (step 1). The pilot injection quantity Qp is determined on the basis of the total fuel injection quantity Qfnl and the engine revolutions Ne, by consulting previously determining map data (not illustrated) (step 2).

The main injection quantity Qm is calculated by subtracting the pilot injection quantity Qp from the total fuel injection quantity Qfnl (step 3). The interval Tint (crank angle) from the end of the pilot injection to the start time of the main injection is determined on the basis of the total fuel injection quantity Qfnl and the engine revolutions Ne (step 4). As shown in the timing chart depicted in FIG. 4, viewed in terms of the lifting of the needle in the injector 10, the interval Tint (crank angle) is the period indicated by [3] in FIG. 4, from the injection end T4 of the pilot injection where needle lift for pilot injection terminates, to the injection start time T6 of the main injection where needle lift is restarted for the main injection. Even during the same injection cycle, the higher the common rail pressure Pr, the greater the amount of fuel injected, and therefore, so that the common rail pressure Pr detected by the pressure sensor 18 is taken into account when determining the basic pulse width Pwm of the main injection command pulse for driving the actuator of the injector 10 in order to inject the main injection quantity Qm (step 5).

The interval Tint (crank angle) is converted to an interval Tint (time, unit: msec) on the basis of the engine revolutions Ne (step 6). A correction pulse width Pwmc (msec) for correcting the basic pulse width Pwmb of the main injection command pulse CPm is deduced from the converted interval Tint (msec) and the common rail pressure Pr (step 7). Although the correction pulse width Pwmc (msec) is calculated with reference to the length of the interval Tint, the shorter the interval Tint, the greater the degree that delay occurs in the main injection timing due to insufficient energy in the actuator drive current. Therefore, the correction pulse width Pwmc is corrected in such a manner that Pwmc becomes longer, as the interval Tint is shorter.

It is then determined whether or not pilot injection is to be implemented (step 8). If pilot injection is to be performed, the pulse width Pwm of the main injection command pulse CPm is then calculated by adding the basic pulse width Pwmb for the main injection command pulse CPm to the correction pulse width Pwmc for CPm (step 9). As indicated by [6] in the timing chart in FIG. 4, the pulse width Pwm of the main injection command pulse CPm goes from the pulse start time T5 of the main injection command pulse, which is the fall timing of the main injection command pulse CPm of the command pulses CP output by the controller 15, to the pulse end time T8 which is the rise timing of CPm. Since there is a response delay in the injector 10, the main injection start time T6, which represents the end time of the interval Tint, is delayed by an injector drive delay time period Td, indicated by [5], from the pulse start time T5.

Next, similarly to the main injection, even during the same injection cycle, the higher the common rail pressure Pr, the greater the amount of fuel injected. Therefore, the common rail pressure Pr is taken into account when determining the pulse width Pwp of the pilot injection command pulse for injecting the pilot injection quantity Qp (step 10). As indicated by [1] in the timing chart in FIG. 4, the pulse width Pwp of the pilot injection command pulse CPp is a pulse width from the pulse start time T1 which is the fall time of the pilot injection command pulse CPp of the command pulses CP output by the controller 15, to the pulse end time T3 at which CPp rises. On the other hand, if it is determined at step 8 that the pilot injection is not to be performed, since no time interval exists, the basic pulse width Pwmb for the main injection command pulse CPm derived at step 5 is set, as it is, to the pulse width Pwm of the main injection command pulse CPm (step 11).

Figure 3:
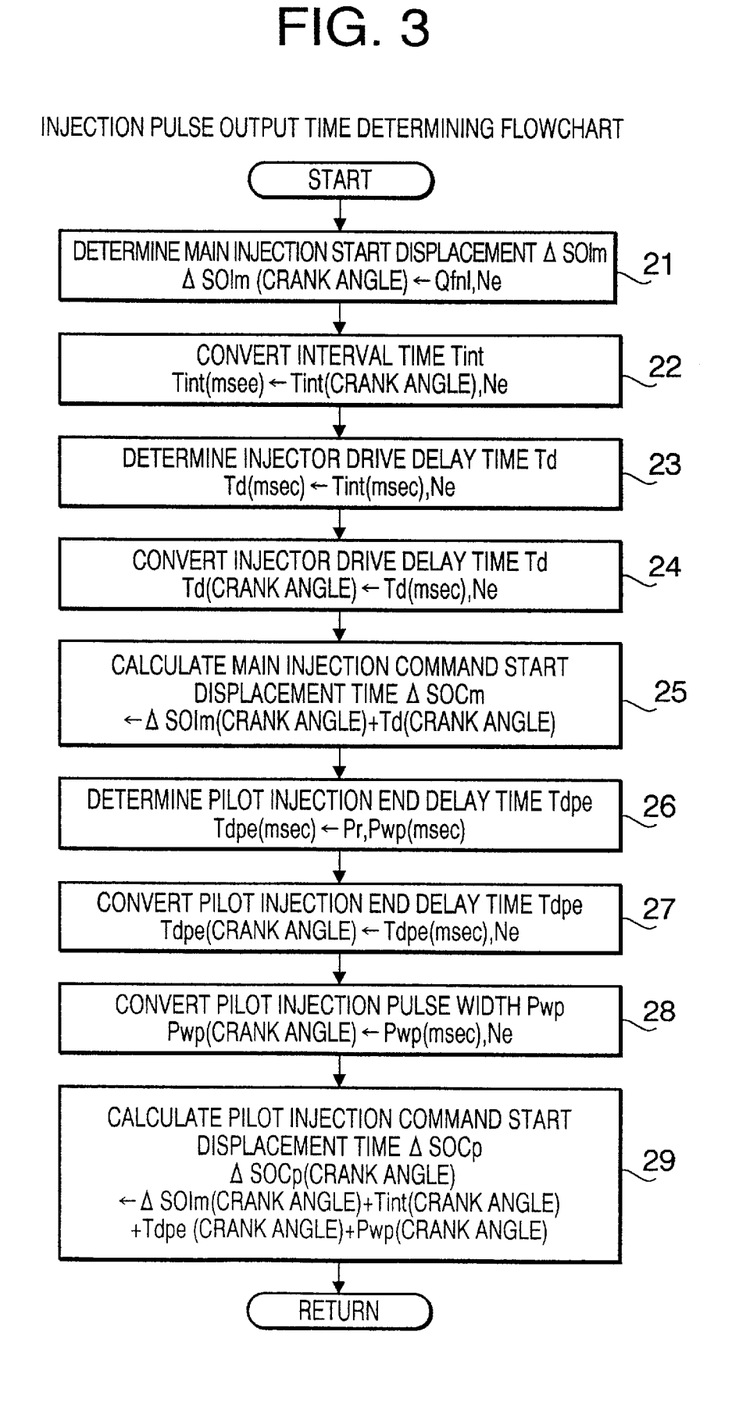
FIG. 3 is a flowchart showing one example of a control sequence for determining the pulse start time point of each command pulse by the controller shown in FIG. 1.
Figure 4:
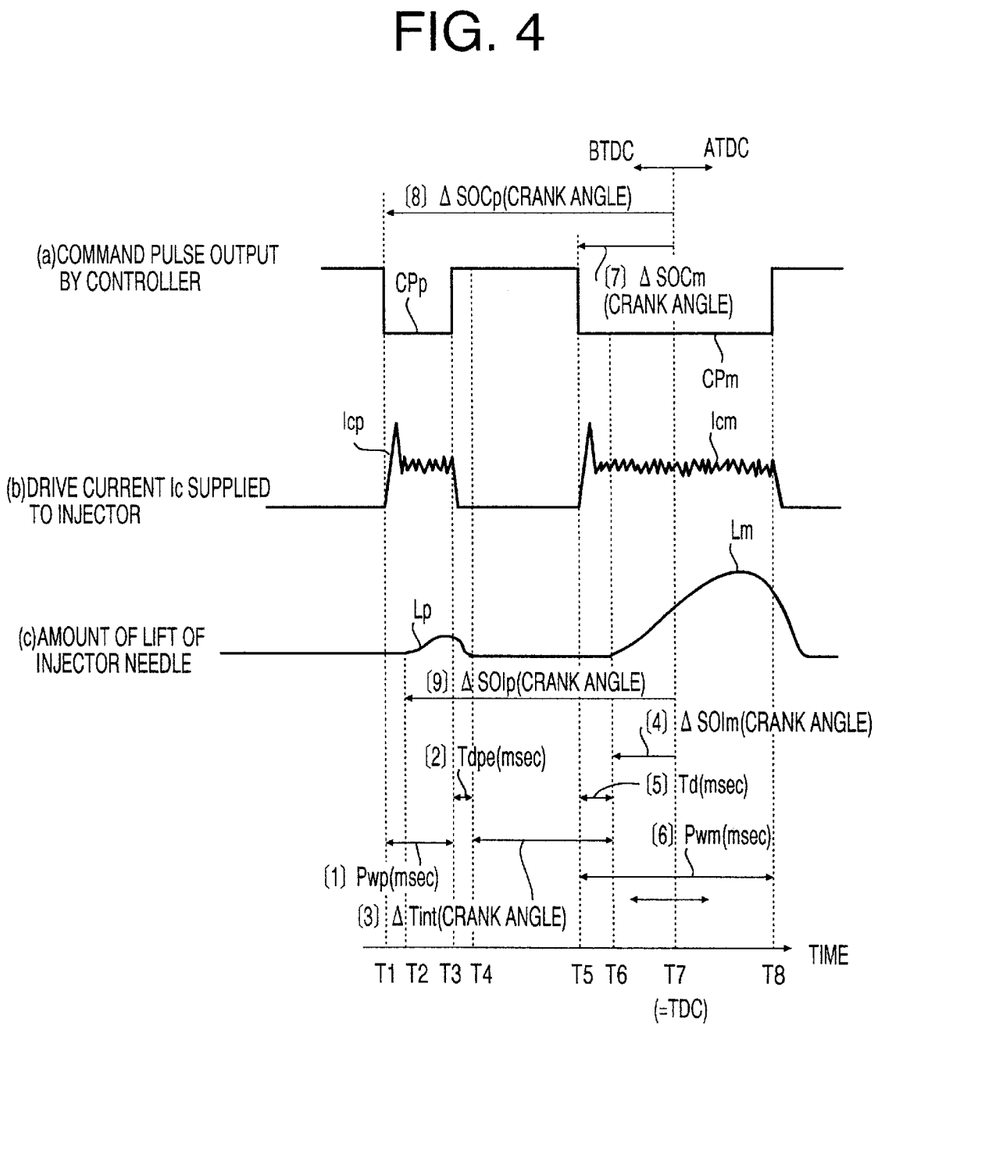
FIG. 4 is a timing chart for injector drive control in the common rail fuel injection device, in other wards, graphs showing a command pulse output by the controller, drive current to an injector, and a lift amount of a needle of the injector.

As shown by the injection pulse output timing determining flowchart in FIG. 3, each of the various timings involved in fuel injection is determined with reference to the top dead center (TDC) which is represented by timing T7 in each cylinder. BTDC designates the period before the top dead center and ATDC designates the period after the top dead center. As indicated by [4] in FIG. 4, the injection start timing T6 which is the target start time at which the main injection will start is determined, on the basis of the total fuel injection quantity Qfnl and the engine revolutions Ne, as a main injection start displacement time ΔSOIm (crank angle), which is an angular displacement for the top dead center time point T7 (as shown in FIG. 4, this time point is not always placed before the top dead center time point T7, but in some cases, is delayed after the top dead center time point T7) (step 21). The interval Tint (crank angle) indicated by [3] in FIG. 4 is converted to an interval Tint (unit msec) expressed as time, on the basis of the engine revolutions Ne (step 22). The injector drive delay time Td (msec) is determined from the converted interval Tint (msec) and the common rail pressure Pr, on the basis of a previously determined map or the like, as the delay response between the pulse start time T5 of the main injection command pulse CPm indicated by [5] in FIG. 4, and the injection start time T6 at which the injector 10 actually starts lift and fuel injection starts (step 23). The shorter the interval Tint, the less sufficient the recovery of the drive current energy for driving the injector. Therefore the injector drive delay time Td increases, as the interval Tint becomes shorter. The injector drive delay time Td (msec) in terms of time is converted to an injector drive delay time Td (crank angle) in terms of crank angle, by taking account of the engine revolutions Ne (step 24).

By adding the main injection start displacement time ΔSOIm (crank angle) determined at step 21 and the injector drive delay time Td (crank angle) converted at step 24, the main injection command start displacement time ΔSOCm (crank angle) for the main injection command pulse CPm is determined, as indicated by [7] in FIG. 4 (step 25). That is, the pulse start time T5 of the main injection command pulse CPm is set to a timing advanced (or delayed) by the main injection command start displacement time ΔSOCm (crank angle), from the top dead center time T7. The main injection command start displacement time ΔSOCm determines the timing T5, which is further advanced by the injector drive delay time Td derived in accordance with the interval Tint, from the injection start time T6 determined by the main injection start displacement time ΔSOIm. Therefore, if the interval Tint becomes short, the pulse start time T5 of the main injection command pulse is advanced significantly, by going back injector drive delay time Td that is set to a long value in accordance with the interval Tint. In this manner, the main injection starts reliably at the injection start time T6 as desired.

The pilot injection end delay time Tdpe (msec) is determined on the basis of the common rail pressure Pr and the pilot injection pulse width Pwp (msec) (step 26). In other words, the pilot injection end delay time Tdpe (msec) indicated by [2] in FIG. 4 is determined in accordance with the magnitude of the common rail pressure Pr, as the period from the end time T3 of the pilot injection pulse width Pwp, which is the rise timing of the pilot injection command pulse CPp, after which the lifting of the needle of the injector 10 for pilot injection terminates, to the start time T4 of the interval Tint. The higher the common rail pressure Pr, the longer the value to which the pilot injection end delay time Tdpe is set. The pilot injection end delay time Tdpe (msec) in terms of time is converted into a pilot injection end delay time Tdpe (crank angle) in terms of crank angle, by taking the engine revolutions Ne into account (step 27).

The pulse width Pwp (msec) of the pilot injection command pulse CPp in terms of time is converted into the pilot injection pulse width Pwp (crank angle) in terms of crank angle, by taking the engine revolutions Ne into account (step 28). Finally, by combining the main injection start displacement time ΔSOIm (crank angle) calculated at step 21, the interval Tint (crank angle) determined at step 4, the pilot injection end delay time Tdpe (crank angle) obtained by converting at step 27, and the pulse width Pwp (crank angle) of the pilot injection command pulse CPp obtained by converting at step 28, the pilot injection command start displacement time ΔSOCp (indicated by [8] in FIG. 4) is calculated as an angular displacement from the top dead center T7, in order to determine the pulse start time T1 of the pilot injection command pulse CPp output by the controller 15 (step 29). The pilot injection start displacement time ΔSOIp (crank angle), which is the timing at which the needle of the injector 10 starts to lift for pilot injection, is indicated by the period [9] in FIG. 4.

As described above, the injector drive delay time determining means 49 (FIG. 1) determines the injector drive delay time Td on the basis of the interval Tint and the common rail pressure Pr. The interval Tint is derived by the interval time determining means 42 on the basis of the engine revolutions Ne and the total fuel injection quantity Qfnl, In other words, the injector drive delay time Td is set with respect to the length of the interval Tint, more specifically, Td is set to a longer value, the shorter the interval Tint. Consequently, the controller 15 outputs the command pulse CPm for main injection by going back (or by the delay of) the main injection command start displacement time ΔSOCm (crank angle) from the top dead center time T7, in such a manner that the fuel injection for main injection starts after the interval Tint has passed from the injection end T4 of the pilot injection. However, since this main injection command start displacement time ΔSOCm, representing a displacement from the top dead center TDC, is set to a timing (T5) which is further advanced by the injector drive delay time Td determined on the basis of the length of the interval Tint, from the injection start time T6 determined by the main injection start displacement time ΔSOIm, accordingly, the main injection command start displacement time ΔSOCm is corrected by the interval Tint. Therefore, the pulse start time T5 of the main injection command pulse CPm is advanced significantly, and the actual main injection starts at the timing of the desired fuel injection start time T6, even in cases where variation occurs in the recovery amount of the current energy for outputting drive signals for actuating the injectors 10, in accordance with the length of the interval Tint.

According to the common rail fuel injection device according to the present invention, a main injection command pulse for main injection and a pilot injection command pulse for pilot injection are output in order to separately perform main injection and pilot injection that is implemented after an interval has passed after the main injection, in accordance with the operating state of the engine. However, since the controller corrects the pulse start time of the main injection command pulse for performing main injection with respect to the interval, it is possible to perform fuel injection at the desired injection start time of the main injection, even if there is variation in the drive current energy for driving the injectors, in accordance with the length of the interval. The tendency that the main injection start time at which injection actually takes place further delays as the interval is shorter is due to influence on the main injection caused by the recovery degree of the drive current for driving the actuators of the control valves in the injectors. However, by correcting the pulse start time of the main injection command pulse and setting a more advanced timing as the interval is shorter, it is possible to start main injection at the desired injection start timing, and hence suppress adverse effects on combustion characteristics.

What is claimed is:

1. A common rail fuel injection device comprising:
   a common rail for accumulating pressurized fuel from a high-pressure fuel supply pump;
   detecting means for detecting an operating state of an engine;
   an injector for injecting fuel supplied from said common rail into a combustion chamber by operation of a control valve, said injector dividing fuel injection into a main injection and a pilot injection that precedes the main injection, in accordance with the operating state of the engine detected by the detecting means; and
   a controller for calculating command pulses corresponding to the main injection and the pilot injection and outputting drive signals corresponding to said command pulses to the control valve,
   wherein said controller determines target injection start time of the main injection and interval from injection end of the pilot injection to the target injection start time of the main injection, on the basis of the operating state of the engine, and calculates pulse start time of said command pulse corresponding to the main injection, in accordance with said interval, in order to adjust an actual injection start time of the main injection to the target injection start time.

2. The common rail fuel injection device according to claim 1, wherein said controller calculates said pulse start time of said command pulse corresponding to the main injection by being advanced by an injector drive delay time determined on the basis of said interval, from said target injection start time of the main injection.

3. The common rail fuel injection device according to claim 2, wherein said controller performs correction for advancing the pulse start time of said command pulse corresponding to the main injection, by setting said injector drive delay time to a greater value, as a value of said interval is shorter.

4. The common rail fuel injection device according to any one of claims 1 to 3, wherein said injector includes:
   a pressure control chamber into which a part of the fuel supplied from said common rail is supplied;
   a needle valve which is moved upwards and downwards by the action of pressure of fuel inside said pressure control chamber, and thereby opens and closes a nozzle formed in the front end part of said injector for injecting fuel;
   said control valve which discharges fuel of said pressure control chamber, and thereby releases fuel pressure of said pressure control chamber; and
   an actuator which is driven by the drive signal, and operates said control valve.

\* \* \* \* \*